(No Model.)
T. CLARK.
CORN POPPER.
No. 475,666. Patented May 24, 1892.
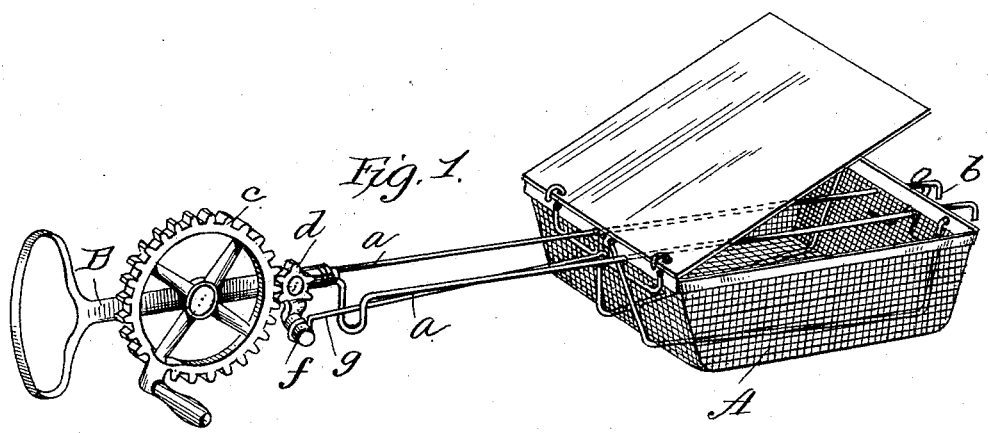
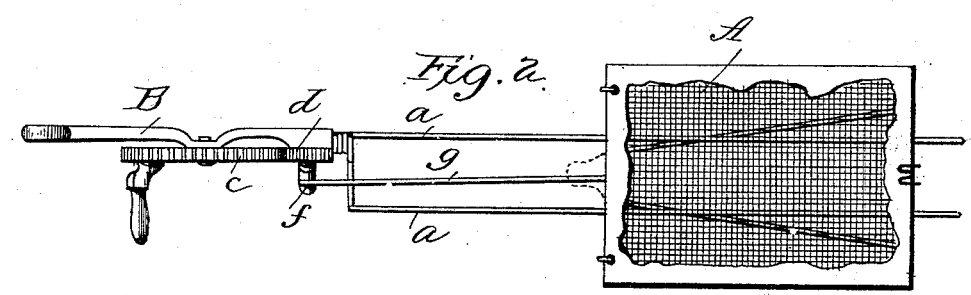
Attest
Walter Donaldson
F. L. Middleton
Inventor
Thomas Clark
by Ellis Spear
Atty.

UNITED STATES PATENT OFFICE.

THOMAS CLARK, OF QUINCY, ILLINOIS.

CORN-POPPER.

SPECIFICATION forming part of Letters Patent No. 475,666, dated May 24, 1892.

Application filed January 14, 1892. Serial No. 418,077. (No model.)

*To all whom it may concern:*

Be it known that I, THOMAS CLARK, a citizen of the United States of America, residing at Quincy, in the county of Adams and State of Illinois, have invented certain new and useful Improvements in Corn-Poppers, of which the following is a specification.

My invention relates to corn-poppers, and is designed to provide a reciprocating movement for the popper without requiring the popper to be shaken, as is ordinarily the case with the poppers now in use.

In carrying out my invention I provide a suitable handle, from which I extend two rods, serving to support the popper, and through which the rods pass, supporting the upper frame of the popper, and I then connect the popper to suitable gearing by a connecting-rod, and by the operation of the gearing the popper is reciprocated on its supporting-rods.

In the accompanying drawings, Figure 1 is a perspective view of the popper. Fig. 2 is a plan view.

In the drawings, the popper A is represented as of ordinary construction, being composed of wire mesh with a metal covering held by a clasp, and the mesh of the body is strengthened by the ordinary wire braces extending across the bottom and up each end to the metal frame, to which the wire mesh is connected.

A handle B, of cast metal preferably, has a wire frame extending from it, consisting of two wires or rods $a$, and these extend through the popper just below the frame, passing out at the rear end of the popper and having the ends $b$ turned downwardly, so as to serve as a stop. This frame supports the popper in its reciprocation and is a very simple manner of providing a support. Upon a stud projecting from the handle I journal a pinion $c$, which is provided with a handle at one edge, and this gears into a small pinion $d$, also pivoted to the handle and having a crank-pin $f$, and between this crank-pin and the popper is a connecting rod or wire $g$, and it will thus be seen that in the rotation of the pinion $c$ rotary movement is communicated to the crank, and through the rotation of the crank and the connecting wire or rod the popper is reciprocated on the wire frame or supporting-rods, and thus renders unnecessary the shaking of the popper, as is ordinarily the case.

The frame which supports the popper in its reciprocation may be below the level of the connecting-rod, so that the popper can be supported while it is being reciprocated.

I claim as my invention—

1. In combination, the receptacle, the handle having the guiding-wires extending therefrom and engaging the receptacle, the operating-rod connected to the receptacle at one end, the pinion journaled on the handle and connected to said rod, and the driving-gear journaled on the handle meshing with the pinion and the handle on the driving-gear, substantially as described.

2. In combination, the receptacle, the handle, the means for reciprocating the receptacle, and the guiding means, consisting of the wires extending from the handle passing through the receptacle and having their ends bent at the rear of the receptacle, substantially as described.

In testimony whereof I affix my signature in presence of two witnesses.

THOMAS CLARK.

Witnesses:
 CHARLES F. OSWALD,
 JOHN H. WILLIAMS.